United States Patent [19]

Shoemaker

[11] Patent Number: 5,179,679
[45] Date of Patent: Jan. 12, 1993

[54] APPARATUS AND METHOD FOR PERMITTING READING OF DATA FROM AN EXTERNAL MEMORY WHEN DATA IS STORED IN A WRITE BUFFER IN THE EVENT OF A CACHE READ MISS

[76] Inventor: Kenneth D. Shoemaker, 18353 Baylor Ave., Saratoga, Calif. 95070

[21] Appl. No.: 739,772

[22] Filed: Jul. 26, 1991

Related U.S. Application Data

[63] Continuation of Ser. No. 334,931, Apr. 7, 1989, abandoned.

[51] Int. Cl.⁵ .................... G11C 7/00; G06F 12/02
[52] U.S. Cl. .................... 395/425; 364/243; 364/243.41; 364/239; 364/239.7; 364/DIG. 1; 395/250; 365/189.05
[58] Field of Search .............. 395/425, 250, 725; 365/230.01, 189.05, 49; 340/799; 364/200 MS File, 900 MS File

[56] References Cited

U.S. PATENT DOCUMENTS

| 4,217,640 | 8/1980 | Porter et al. | 364/200 |
|---|---|---|---|
| 4,354,232 | 10/1982 | Ryan | 364/200 |
| 4,439,829 | 3/1984 | Tsiang | 364/200 |
| 4,467,414 | 8/1984 | Akagi et al. | 364/200 |
| 4,561,051 | 12/1985 | Rodman et al. | 364/200 |
| 4,805,098 | 2/1989 | Mills, Jr. et al. | 364/200 |
| 4,939,641 | 7/1990 | Schwartz et al. | 364/200 |
| 4,959,771 | 9/1990 | Ardini, Jr. et al. | 364/200 |
| 5,123,097 | 6/1992 | Joyce et al. | 395/375 |

OTHER PUBLICATIONS

IBM TDB, vol. 23, No. 1, Jun. 1980, Written by Blount et al., "Deferred Cache Storing Method" pp. 262-263.
Cenrier & Feautrier, A New Solution to Coherence Problems in Multicache Systems, IEEE Transactions on Computers, vol. C-27, No. 12, Sep. 1978, pp. 1112-1118.
"Cache Memories", by Alan Jay Smith, Computer Surveys, vol. 14, No. 3, Sep. 1982.

Primary Examiner—Michael R. Fleming
Assistant Examiner—Gopal C. Ray

[57] ABSTRACT

A microprocessor is described which includes on a single substrate a central processing unit (CPU), write buffer and cache memory. The write buffer includes storage in each of its sections for a bit which indicates a hit/miss condition for the write cycle data stored in that section of the write buffer. If all these bits indicate that the new data in the write buffer has also been written into the cache memory, then read cycles are permitted before the data in the write buffer is written to external memory.

11 Claims, 3 Drawing Sheets

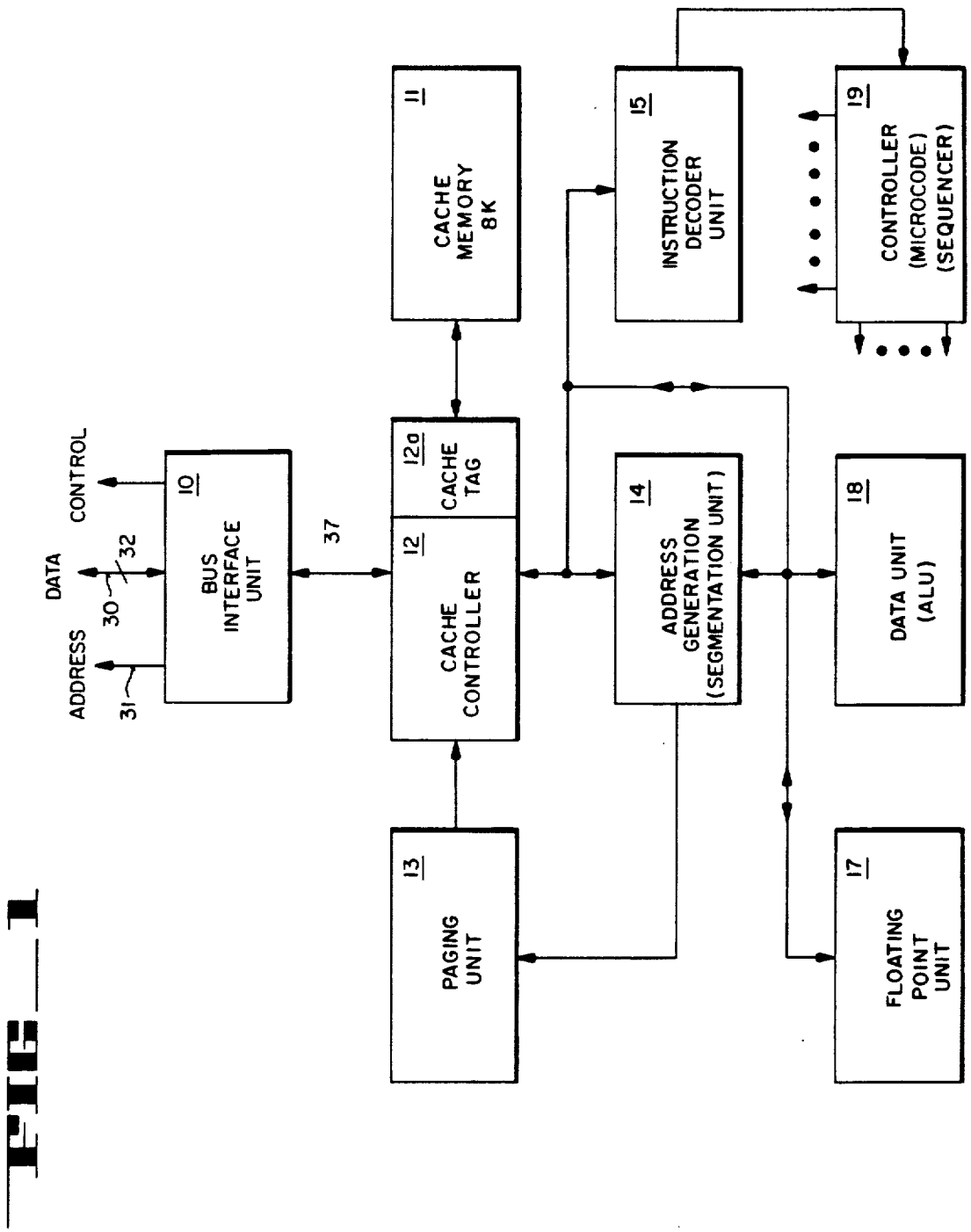
FIG_1

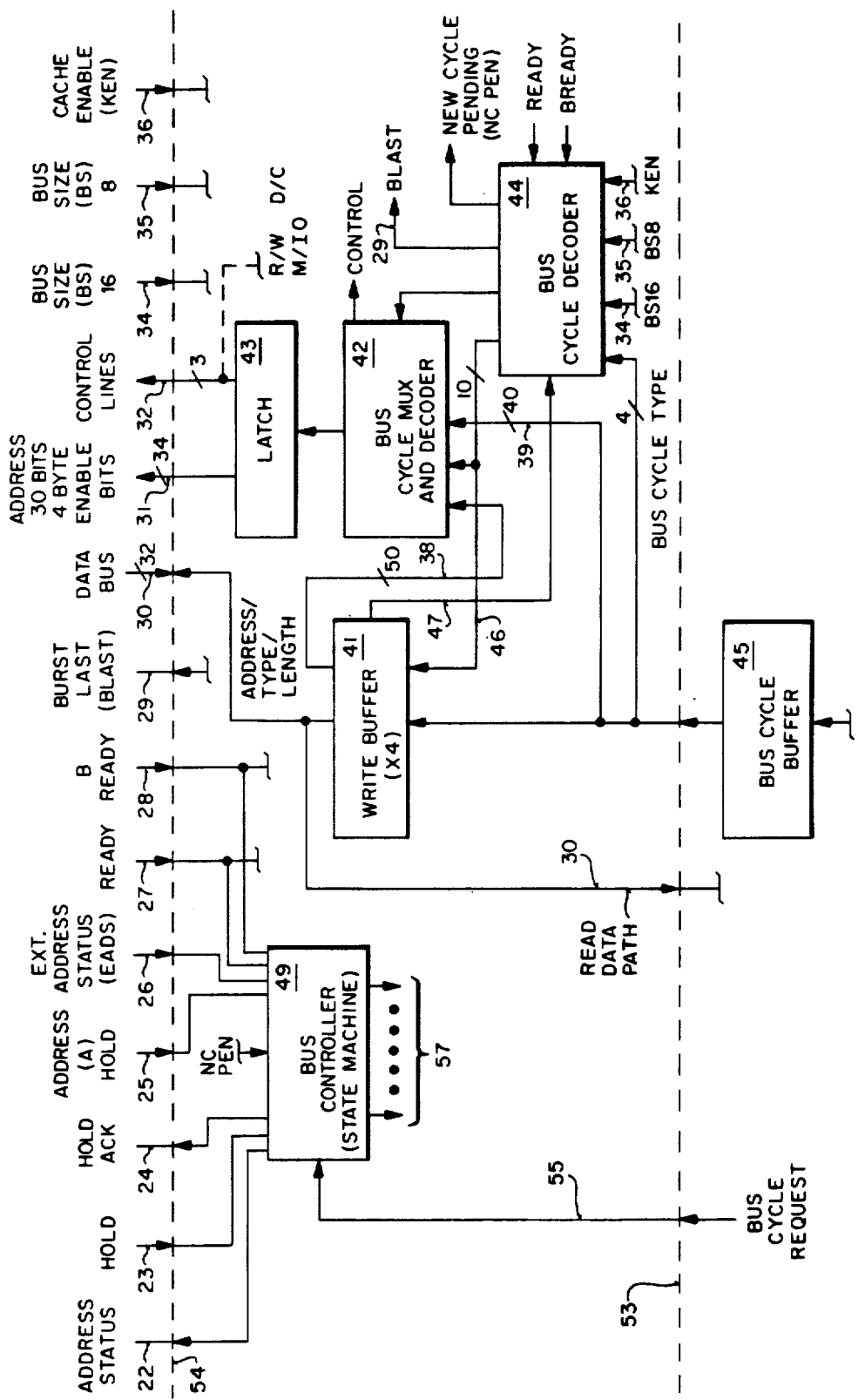
FIG_2

FIG_3
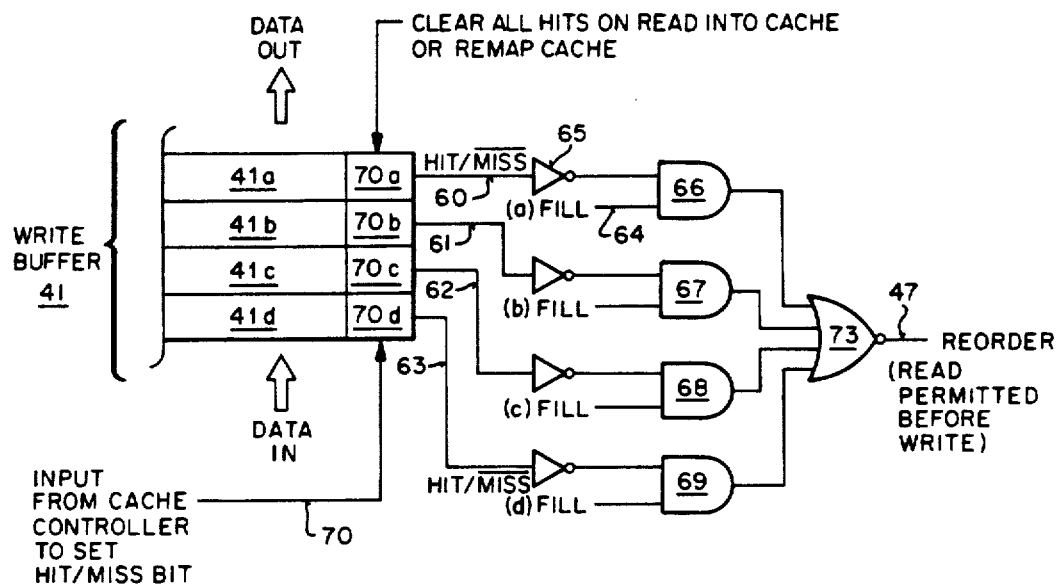
FIG_4
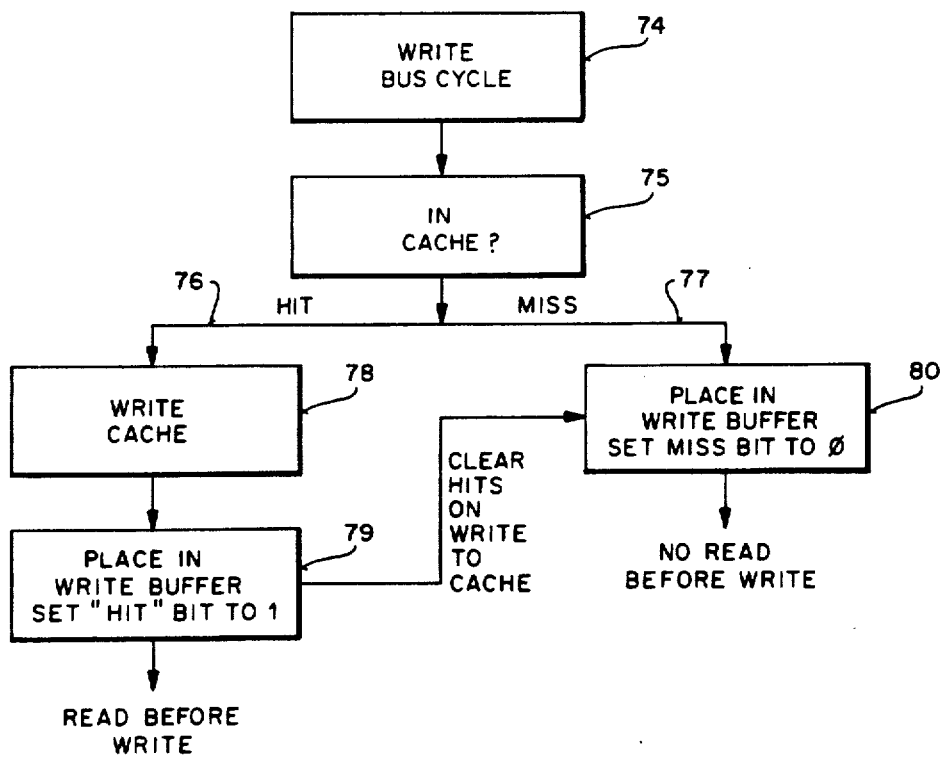

APPARATUS AND METHOD FOR PERMITTING READING OF DATA FROM AN EXTERNAL MEMORY WHEN DATA IS STORED IN A WRITE BUFFER IN THE EVENT OF A CACHE READ MISS

This is a continuation of copending application Ser. No. 07/334,931 filed on Apr. 7, 1989 now abandoned.

BACKGROUND OF THE INVENTION

1. Field of the Invention

The invention relates to the field of microprocessors and more particularly to the control of read/write cycles.

2. Prior Art

It is not uncommon for a microprocessor to include a write buffer. A write buffer accepts data from a central processing unit (CPU) over an internal bus of the microprocessor and temporarily stores the data before it is written into external memory over an external bus. These buffers are used to increase the performance of microprocessors by accepting data at a faster rate than the data can be written into external memory. Without such buffers, the CPU would be forced to operate at the typically slower rate of external RAM (such as dynamic RAMs) for write cycles. Moreover, external memory is not always immediately available, for instance, it may be refreshing when access is requested by the CPU.

In some cases the CPU requests a read cycle before all the data in the write buffer has been written into external memory. (Read cycles must be intermixed with write cycles if CPU performance is to be maximized.) But what if the CPU is addressing a location in external memory for which data is stored in the write buffer? If the read cycle is allowed to proceed, the old data will be read into the CPU while the new data remains uselessly in the write buffer. This, of course, presents an unacceptable condition.

One method of preventing the reading of the old data by the CPU is simply to prevent read cycles until all the data in the write buffers has been read into external memory. The disadvantage of this method is that it impacts the performance of the microprocessor since the microprocessor must wait a potentially long time to allow the write buffer to update external memory before a read cycle.

Another method of avoiding this problem is to compare the addresses generated for the read cycle against the addresses associated with the data in the write buffer. (The write buffer typically stores an address and the data to be stored at that address.) If there is no match, a read cycle can occur since the CPU is not seeking data stored in the write buffer. This method has the disadvantage of requiring a significant amount of logic to perform the comparison of the addresses.

It is also known in the prior art to use cache memories in connection with microprocessors. Some of these cache memories are "write-through" cache memories in that data generated by the CPU updates the cache memory if the address associated with the data is found in the cache memory in addition to being written into external memory.

As will be seen, the present invention provides a method and apparatus for reordering read/write cycles in a microprocessor that includes a write buffer and a cache memory. The invention is realized with a minimum of circuitry.

SUMMARY OF THE INVENTION

The present invention, in its currently preferred embodiment, is utilized in a CMOS microprocessor which includes on a single substrate a central processing unit (CPU), cache memory and a write buffer having a plurality of sections. Data is coupled from the CPU over an internal bus to the write buffer before being coupled to external memory over an external bus. The microprocessor includes a comparator means for determining if the address associated with data matches an address associated with data stored in the cache memory. This comparator means in the currently preferred embodiment is the same circuitry used on a read cycle to determine a cache "hit" or "miss". The invention employs storage means for storing at least one bit for each section in the write buffer. (Each section of the buffer stores the data which is coupled to external memory on a single write cycle.) These bits represent the determination made by the comparator means. More specifically, in the currently preferred embodiment, the storage means is part of the write buffer and stores one bit per section which indicates a hit or miss for the data in that section. Logic means is coupled to receive these bits from the storage means. The logic means permits the microprocessor to read data from external memory even with data present in the write buffer if there is a hit bit associated with each section of data stored in the write buffer.

Other aspects of the invention are described below.

BRIEF DESCRIPTION OF THE DRAWINGS

FIG. 1 is a general block diagram showing the various units that make up the microprocessor of the currently preferred embodiment.

FIG. 2 is a block diagram of the bus interface unit which includes the write buffer and associated logic used in the microprocessor of FIG. 1.

FIG. 3 is a schematic showing specific logic associated with the write buffer and used to generate a signal which permits a read cycle while data is present in the write buffer.

FIG. 4 is a flow diagram illustrating the steps associated with the method of the present invention.

DETAILED DESCRIPTION OF THE PRESENT INVENTION

A method and apparatus for reordering read and write cycles in a microprocessor is described. In the following description, numerous specific details are set forth, such as specific number of bits, etc., in order to provide a thorough understanding of the present invention. It will be obvious, however, to one skilled in the art that the present invention may be practiced without these specific details. In other instances, well-known circuits have not been shown in detail in order not to unnecessarily obscure the present invention.

OVERALL BLOCK DIAGRAM OF THE MICROPROCESSOR

Referring to FIG. 1, the microprocessor in which the present invention is used is shown in general block diagram form. The bus interface unit 10 is coupled to a 32-bit external data bus 30, external address bus 31 and several other control lines as will be described in conjunction with FIG. 2. (Note the term "data" is generally used to indicate information transferred over the data bus. This information may include instructions, constants, pointers, etc.) Some of the circuitry used for the present invention is included in the interface unit including the write buffer. The interface unit 10 is coupled by internal address and data buses 37 to a cache memory controller 12.

Controller 12 controls the accessing of the cache memory 11. The controller 12 includes a cache tag section 12a. This section receives addresses and then determines if data associated with that address is stored in the cache memory (a "hit" if data is in the memory and a "miss" if it is not). Any one of a plurality of well-known circuits may be used for this purpose. Often such circuitry includes a content-addressable memory (CAM). However, in the currently preferred embodiment, the cache tag 12a uses static RAM and a plurality of comparators.

The cache controller 12 is coupled to the address generation unit 14; a paging unit 13 is also coupled between the address generation unit 14 and cache controller 12. For purposes of understanding the present invention, the address generation unit may be assumed to be the same as that used in the commercially available Intel 80386. This microprocessor is well described in numerous publications such as 80386 *Microprocessor Handbook* by Pappas and Murray, published by Osborne McGraw-Hill (1988). The segmentation and paging units for the Intel 80386 are described in copending application; Ser. No. 744,389; filed Jun. 13, 1985; entitled "Memory Management for Microprocessor" (this application is assigned to the assignee of the present invention).

For purposes of understanding the present invention, the specific configuration of a cache memory 11 and cache controller 12 are not important. Signal flow between the controller 12 and interface unit 10 insofar as needed to understand the present invention is described in conjunction with FIGS. 2 and 3.

Within the microprocessor, instructions are coupled to the instruction decoder unit 15. The decoder unit operates with a controller 19 in which microcode instructions are stored; the controller 19 provides sequences of control signals for the microprocessor. The instruction decoder unit 15 is shown coupled to controller 19; the outputs from the controller are coupled to all the other units of the microprocessor. The data unit 18 is an arithmetic logic unit (ALU) which performs ALU functions in a similar manner to those performed by the Intel 80386.

The microprocessor also includes a floating point unit 17 for performing floating point computations. The precise configuration of the unit 17 is not critical to the present invention.

In the currently preferred embodiment, the entire circuitry for the microprocessor of FIG. 1 is an integrated circuit formed on a single substrate. The microprocessor is realizable with known metal-oxide-semiconductor (MOS) technology and, in particular, with complementary MOS (CMOS) technology. The "central processing" performed by the microprocessor is generally that performed by the ALU or floating point unit.

BLOCK DIAGRAM OF BUS INTERFACE UNIT

The major components of the bus interface unit 10 of FIG. 1 are shown in FIG. 2 between the dotted lines 53 and 54. The cache controller 12 communicates with the interface unit 10 through an internal microprocessor bus and the bus cycle buffer 45. All memory addresses, various control signals and all data to be entered into external memory are communicated to unit 10 through the buffer 45. Incoming data (read cycle data path) is communicated directly to the cache controller 12 through the interface unit 10 over bus 30.

The output data of buffer 45 (write cycle data) is coupled to the write buffer 41. This buffer is "4 deep", thus permitting data from buffer 45 for four CPU write cycles to be temporarily stored in one of the four sections of the buffer 41. This buffer is used in the present invention as is discussed below. The write cycle data output of the buffer 41 communicates with the data bus 30. Also stored in buffer 41 and associated with data stored in each of the four sections are signals representing the memory address, memory cycle type, length and hit/miss bit used with the present invention. The signals representing bus cycle type, etc., are coupled from the decoder 44 via lines 46 to the buffer 41 and to the bus cycle multiplexer and decoder 42.

The bus cycle multiplexer and decoder 42 for write cycles selects either the address signals, bus type signals, etc., (i) from the buffer 41 (lines 38) or, (ii) directly from the buffer 45 (lines 39) and lines 46. The output of multiplexer and decoder 42 is coupled to the latch 43. The output of the latch provides the address signals (30 bits of address and 4 bits of byte enable signals) on bus 31 and control lines for the memory on lines 33.

Four bits from the buffer 45 are coupled to the bus cycle decoder 44 to indicate the type of bus cycle. These bits indicate up to 16 different types of bus cycles, such as memory read, memory write, I/O read/write, prefetch, branch, locked read, locked write, write not finished, in-circuit emulator (read or write), and read and write to paging unit 13. The bus cycle type bits are decoded in decoder 44 and used to control, for example, the multiplexer 42. With the present invention, logic (shown in circuit form in FIG. 3) can cause, for example, a write cycle to occur even though a read cycle is requested. Signals from buffer 41 are coupled to decoder 44 for this purpose over line 47. This is described in detail in conjunction with FIGS. 3 and 4.

The bus controller 49 receives a bus cycle request signal on line 55 in addition to several other inputs. The bus controller provides control signals on lines 57 to the various circuits in the bus interface unit 10 including the bus cycle decoder 44, bus cycle multiplexer and decoder 42, latch 43 and buffer 41. The bus controller operates as an ordinary state machine.

The bus cycle decoder 44 provides the blast signal (burst last, sometimes referred to as the last signal). This signal (active low) indicates that a microprocessor data request (input or output) will be satisfied at the next ready signal on lines 27 or 28. The generation of this signal and its use including its interaction with the cache enable signal (KEN) on line 36 as well as other aspects of the interface unit are described in copending application; Ser. No. 227,078; filed Aug. 1, 1988 now U.S. Pat. No. 5,073,969; entitled MICROPROCESSOR BUS INTERFACE UNIT; and assigned to the assignee of the present invention.

INPUTS TO AND OUTPUTS FROM THE BUS INTERFACE UNIT 10

The major external inputs to the bus interface unit and the major outputs (to external circuitry) from the unit 10 are shown in FIG. 2 along line 54. The data bus 30 is a 32-bit bidirectional bus. The microprocessor provides a memory address on the address bus 31. This address consists of 30 bits of address signals and four byte enable bits. The three memory control lines 33 indicate read/write to memory, input/output and data vs. control (for example, prefetch from memory vs. data read). The address status (ADS) is an active low signal on line 22 indicating that the address on bus 31 is valid.

The memory cycle requests by the microprocessor generally require 32 bits of data read from memory or written to memory (larger transfers such as those associated with a cache memory are used). In some cases, the memory may be limited to an 8-bit or 16-bit bus. If this is the case, the memory provides an appropriate signal on lines 34 or 35. The signal on line 35 (bus size 8) indicates that the transfer will be satisfied with eight bit transfers whereas the signal on line 34 (bus size 16) indicates that the request will be satisfied with 16 bit transfers.

As mentioned, the microprocessor includes an on-chip cache memory. Certain data is designated for storage within the cache memory. External circuitry examines addresses from the microprocessor and determines if a particular address falls within address space designated for storage within the cache memory. This is generally done for instructions, constants, etc., and not done for data which is shared. If external circuitry determines that the data requested is "cacheable", that is, it should be stored in the cache memory, then the KEN signal is returned (active low) on line 36.

The input on line 23 is an ordinary "hold" signal and the output on line 24 is a "hold acknowledge" signal. The input signal on line 25 (address hold) indicates that the external bus is to be immediately floated. This is done to prevent system deadlock with other equipment on the bus. Line 26 provides an external address status. Lines 27 and 28 receive a ready signal and a "burst" ready signal, respectively.

LOGIC IMPLEMENTED IN THE CIRCUIT OF FIG. 3

FIG. 3 illustrates the logic employed in the present invention which is used to determine the ordering or reordering of read and write cycles. The gates shown in FIG. 3 have been selected for purposes of providing an understanding of the present invention. As will be appreciated, and as is customarily the case with integrated circuits, the logic implemented by the gates in the actual circuit is intermingled with other logic and circuitry not pertinent to the present invention.

The write buffer 41 of the presently preferred embodiment is, in effect, a first-in, first-out (FIFO) register having four sections, 41a, 41b, 41c and 41d. The data into the buffer (including the addresses and related signals) are coupled from the buffer 45 and decoder 44. The data-out from the buffer is coupled to the bus 30 with the addresses being coupled to the decoder 42, then to the latch 43.

The write buffer 41 provides additional storage for the present invention. Each section of the buffer includes one additional bit of storage which bit is representative of whether or not the address associated with the write cycle data in that section is found in the cache memory. For example, if data is placed into the write buffer section 41d, along with the address F0000000, this address is coupled to the cache controller of FIG. 1 to determine if the data for that address is found in the cache memory. If the data for that address is in the cache memory, this memory is updated with the new data. The data is also written into section 41d of the write buffer 41. If the data is found in the cache memory (a "hit") a binary one is written into the bit location 70d. If the data is not present in the cache memory (a "miss") then a binary zero is written into location 70d. The hit/miss bit information is coupled to the location 70d from the cache controller 12a after a comparison of addresses is made for the write cycle data coupled to the write buffer 41. This is shown in FIG. 3 by line 70. As the data is moved from section 41d to section 41c, etc., in the write buffer, the hit/miss bit associated with it is likewise moved from bit location 70d to 70c, etc. (This bit, however, is not coupled to an external bus as is the data, address and control bits.)

The hit/miss bit associated with each of the sections of the buffer 41 are coupled through an inverter and then to one input terminal of an AND gate. For instance, the bit at location 70a is coupled through line 60 to inverter 65; the output of inverter 65 is coupled to one input terminal of AND gate 66. Similarly, the bit from location 70b is coupled along line 61 through an inverter to one input terminal of the gate 67; the bit from location 70c is coupled along line 62 through an inverter to one input terminal of the gate 68; and, the bit from location 70d is coupled along line 63 through an inverter to one input terminal of the gate 69.

The outputs of gates 66, 67, 68 and 69 are coupled to input terminals of a NOR gate 73. The output of this gate is shown as line 47.

Each of the gates 66 through 69 receives a "fill" (filled or full) signal from one of the four sections of the write buffer 41 which acts as a masking bit for its respective gate. Specifically, if data is present in section 41d of the write buffer, the fill bit for this section is a binary one which is coupled to gate 69. If this data is moved to section 41c without new data being moved into section 41d, then the fill bit coupled to gate 69 is a binary zero, and the fill bit coupled to gate 68 is a binary one. Similarly, if there is data stored in section 41b a binary one is coupled to gate 67. And, by way of example, if no data is present in section 41a then a binary zero is coupled to line 64. Ordinary circuit means are used to provide this masking bit, such circuit being known for buffers/registers.

The hit/miss bits in the location 70a through 70d are cleared (all bits changed to binary zero no matter what their previous state) when data is read into the cache memory from external memory or when a remapping occurs in the cache memory (e.g., tags changed because a line of data was invalidated). Note under either of these conditions the hit/miss bit becomes void.

Assume that write cycle data is placed in section 41d and its associated address is not found in the cache memory. A binary zero is thus present in bit location 70d. The inputs to the gate 69 are a binary one because of the inverter and the fill bit is a binary one, that is, no masking is occurring. For these conditions, a binary one is present at the output of gate 69. With the binary one at the input to the gate 73, the output on line 47 will be low no matter what the inputs to gates 73 from gates 66, 67 and 68. Under these conditions, the reorder signal on line 47 will indicate that reading should not occur before writing, that is, until all the data in the write buffer associated with a miss bit has been read into external memory. It can be appreciated for this example that data in section 41d may be sought by the CPU and if reading occurs before writing, the CPU may receive incorrect data from external memory.

Assume now that data has been loaded into the four sections of buffer 41 and the addresses associated with each are present in the cache memory. Under these conditions, bit locations 70a, 70b, 70c and 70d will contain binary ones. Also, since each of the sections are filled with data, the fill bit associated with each section will be binary ones. The input to each of the gates 66 through 69, therefore, is a binary zero for the hit/miss bit and a binary one for the fill bit. The output each of the AND gates is thus a binary zero. With all zeroes as inputs to the NOR gate 73, a binary one is present on line 47. Under these conditions, a read is permitted before the data in the write buffer 31 is written into external memory. Note under these conditions the CPU obtains the new data from the cache memory. This situation is more the norm in typical operation since frequently, addresses generated by the CPU will be found in the cache memory from external memory.

During a read cycle, data may be loaded into the cache memory. As soon as this occurs, all the bits 70a through 70d are changed to binary zeroes as mentioned, thus requiring that the data in the write buffer be transferred to external memory before the next read cycle.

Whenever a new bus cycle is to be run on the external data bus, the decoder logic associated particularly with decoder 44 decides which cycle is to be run by determining whether data is queued in the write buffer, whether a cycle is present in buffer 45 and whether there is a signal present on line 47. When a read cycle is present within the buffer 45 and data exists within the write buffer 41, the decoder will choose to run the read cycle if a signal is present on line 47. Thus, microprocessor performance is not compromised. If, however, any of the data in the write buffer is associated with a cache miss, then the read cycle will not be selected until the data marked as cache misses have been transferred from the write buffer 41. This, of course, assures that on a read cycle updated data is read from external memory.

METHOD OF THE INVENTION ILLUSTRATED BY FIG. 4

The method implemented by the present invention is illustrated in FIG. 4 starting with the block 74. This block represents the initiation of a typical write bus cycle. When this occurs, the address associated with the data is passed to the cache controller to determine if data for that address is located in the cache memory. This is illustrated by block 75 which asks the question "IN CACHEz?". The results of a comparison of the addresses associated with the data to be written into external memory against the addresses associated with the data in the cache memory produce either a hit as shown by line 76, or a miss as shown by line 77. In the case of a hit, the new data is written into the cache memory as shown by block 78 and then as shown by block 79, the data is placed in the write buffer and the hit bit is set to a binary one. Under these conditions, a read can occur before a write if the hit bit is set to a binary one for all the write cycle data in the write buffer.

Conversely, if a miss occurs as indicated by line 77, there is no need to update the cache memory and the data is placed in the write buffer as indicated by block 80. The hit bit remains a binary zero and reading is prevented before writing this data in the write buffer to external memory. (Upon initialization and upon shifting of data from one stage to the next in the write buffer, the hit bit becomes or remains a binary zero unless new data is moved into that section.)

Thus, an apparatus and method has been described which permits the reordering of read and write cycles in a microprocessor. The apparatus and method of the present invention is implemented with a minimum of circuitry and in part relies upon other circuitry already found in, or associated with, cache memories.

I claim:

1. A microprocessor comprising:
   a central processing unit (CPU);
   a cache memory coupled to said CPU;
   a write buffer for providing buffering of write cycle data which is to be transferred over an external bus from said CPU to an external memory during a write cycle;
   comparator means coupled to said CPU for determining if addresses associated with said write cycle data match any addresses associated with data stored in said cache memory;
   storage means for storing bits of information representative of said determination made by said comparator means, said storage means being coupled to said comparator means; and
   logic means coupled to receive said bits from said storage means for enabling said microprocessor to read data from said external memory when said data is not located in said cache memory and said bits are in a predetermined state that indicates whether each of the addresses associated with said write cycle data matches an address associated with data stored in said cache memory, said microprocessor being disabled from reading data from said external memory otherwise.

2. The microprocessor defined by claim 1 wherein said storage means comprises a part of said write buffer.

3. The microprocessor defined by claim 1 including additional means coupled to said storage means for changing the state of said bits upon occurrence of a predetermined condition.

4. The microprocessor defined by claim 3 wherein said predetermined condition comprises the writing of data into said cache memory from said external memory.

5. The microprocessor defined by claim 3 wherein said predetermined condition comprises the remapping of data in said cache memory.

6. The microprocessor defined by claim 1 wherein signals are coupled to said logic means from said write buffer to indicate whether said write buffer is storing said write cycle data.

7. The microprocessor defined by claim 1 wherein said write buffer comprises a first-in-first-out (FIFO) register having a plurality of sections, each section storing write cycle data and including a bit location for storing one of said bits.

8. A microprocessor including:
   a cache memory;
   a write buffer for temporarily storing data to be written into an external memory, said write buffer having a plurality of sections for storing data and addresses;
   a bit location associated with each of said sections of said write buffer for storing a bit representative of a hit/miss condition, said hit/miss condition indicating whether an address stored in said write buffer corresponds to an address stored in said cache memory; and logic means coupled to said bit locations for permitting said microprocessor to read a data item from said external memory when said data item is not located in said cache memory and said bits are in a predetermined state that indicates whether each of the addresses stored in said write buffer matches an address stored in said cache memory, said microprocessor not being permitted to read data from said external memory otherwise.

9. The microprocessor defined by claim 8 including masking means for masking said bits in said logic means, said masking being determined by the presence or absence of data in said section of said write buffer.

10. A method of operating a microprocessor coupled to a external memory, said microprocessor having a write buffer and a cache memory, said method comprising the steps of:
   storing in said write buffer write cycle data to be written into said external memory;
   determining by said microprocessor whether address correspondence exists for said write cycle data and data stored in said cache memory;
   storing by said microprocessor for said write cycle data information representing said hit or miss; and
   permitting said microprocessor to read data from said external memory in the event of a cache read miss while write cycle data is present in said write buffer; otherwise, said microprocessor not being permitted to read data from said external memory.

11. A computer system comprising;
   a central processing unit (CPU);
   a cache memory coupled to said CPU;
   an external memory coupled to said CPU;
   a storage means for temporarily storing a plurality of data items to be written into said external memory, said storage means being coupled to receive said data items from said CPU, said storage means including a bit means for indicating whether each of said data items is present in said cache memory; and
   logic means coupled to said storage means and said CPU for permitting said CPU to read an additional data item from said external memory when said additional data item is not located in said cache memory and said bit means indicates that said plurality of data items are present in said cache memory, said CPU not being permitted to read data from said external memory otherwise.

* * * * *

UNITED STATES PATENT AND TRADEMARK OFFICE
CERTIFICATE OF CORRECTION

PATENT NO. : 5,179,679

DATED : 1/12/93

INVENTOR(S) : Kenneth D. Shoemaker

It is certified that error appears in the above-indentified patent and that said Letters Patent is hereby corrected as shown below:

Column 7, line 50, delete "IN CACHEz?" insert --IN CACHE"--.

Column 9, line 22, delete ";" insert --(hit or miss);--.

Signed and Sealed this

Seventh Day of March, 1995

*Attest:*

BRUCE LEHMAN

*Attesting Officer*     *Commissioner of Patents and Trademarks*